United States Patent
Li et al.

(10) Patent No.: US 9,633,126 B2
(45) Date of Patent: Apr. 25, 2017

(54) METHOD AND SYSTEM FOR SYNCHRONIZING BROWSER BOOKMARKS

(71) Applicant: TENCENT TECHNOLOGY (SHENZHEN) COMPANY LIMITED, Shenzhen (CN)

(72) Inventors: Wei Li, Shenzhen (CN); Bo Hu, Shenzhen (CN); Ruiyi Zhou, Shenzhen (CN); Xi Wang, Shenzhen (CN); Kai Zhang, Shenzhen (CN); Zhengkai Xie, Shenzhen (CN); Xin Qing, Shenzhen (CN); Bosen He, Shenzhen (CN); Huijiao Yang, Shenzhen (CN); Ying Huang, Shenzhen (CN); Yulei Liu, Shenzhen (CN); Cheng Feng, Shenzhen (CN); Tingyong Tang, Shenzhen (CN); Sha Mo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 469 days.

(21) Appl. No.: 14/285,734

(22) Filed: May 23, 2014

(65) Prior Publication Data
US 2014/0289316 A1 Sep. 25, 2014

Related U.S. Application Data

(63) Continuation of application No. PCT/CN2013/088034, filed on Nov. 28, 2013.

(30) Foreign Application Priority Data

Mar. 22, 2013 (CN) .......................... 2013 1 00938328

(51) Int. Cl.
*H04L 29/08* (2006.01)
*H04L 29/06* (2006.01)
*G06F 17/30* (2006.01)

(52) U.S. Cl.
CPC .... *G06F 17/30884* (2013.01); *H04L 67/1095* (2013.01)

(58) Field of Classification Search
CPC .......... G06F 17/30884; H04L 67/1095; H04L 29/06047; H04L 29/08162;
(Continued)

(56) References Cited

U.S. PATENT DOCUMENTS 8,601,162 B1 * 12/2013 O'Shaughnessy ...... H04L 67/06
709/200
8,938,422 B1 * 1/2015 Liu .................. G06F 17/30884
707/628

(Continued)

FOREIGN PATENT DOCUMENTS

CN 101965725 2/2011

OTHER PUBLICATIONS

The World Intellectual Property Organization (WIPO) International Search Report for PCT/CN2013/088034 Mar. 13, 2014.

*Primary Examiner* — Kostas Katsikis
*Assistant Examiner* — Billy H Ng
(74) *Attorney, Agent, or Firm* — Anova Law Group, PLLC

(57) ABSTRACT

Methods and systems for synchronizing browser bookmarks are provided herein. In an exemplary method, a server can receive a bookmark collection sent by a first terminal browser. The bookmark collection can contain one or more bookmarks. The server can push the bookmark collection to a second terminal browser for the second terminal browser to simultaneously add the one or more bookmarks contained (Continued)

in the bookmark collection as bookmarks of the second terminal browser.

15 Claims, 5 Drawing Sheets

(58) Field of Classification Search
CPC ......... H04L 29/08225; H04L 29/08522; H04L 29/0872; H04L 67/1002; H04L 67/1091; H04L 67/42
See application file for complete search history.

(56) References Cited

U.S. PATENT DOCUMENTS

| | | | |
|---|---|---|---|
| 2003/0046290 A1* | 3/2003 | Yamada | G06F 17/30884 |
| 2005/0210145 A1* | 9/2005 | Kim | G06F 17/30849 709/231 |
| 2008/0010286 A1* | 1/2008 | Zhang | G06F 17/30884 |
| 2008/0201418 A1* | 8/2008 | Krishnan | G06F 17/30861 709/204 |
| 2009/0144392 A1* | 6/2009 | Wang | G06Q 10/10 709/217 |
| 2010/0050067 A1* | 2/2010 | Curwen | G06F 17/30884 715/206 |
| 2010/0138731 A1 | 6/2010 | Cantegrel | |
| 2012/0297466 A1* | 11/2012 | Li | G06F 21/10 726/7 |
| 2013/0254685 A1* | 9/2013 | Batraski | H04L 67/1095 715/760 |

\* cited by examiner

METHOD AND SYSTEM FOR SYNCHRONIZING BROWSER BOOKMARKS

CROSS-REFERENCES TO RELATED APPLICATIONS

This application is a continuation application of PCT Patent Application No. PCT/CN2013/088034, filed on Nov. 28, 2013, which claims priority to Chinese Patent Application No. 201310093832.8, filed on Mar. 22, 2013, the entire contents of all of which are incorporated herein by reference.

FIELD OF THE DISCLOSURE

The present disclosure generally relates to browser technology and, more particularly, relates to methods and systems for synchronizing browser bookmarks.

BACKGROUND

Bookmark is a tool for saving web page addresses in a browser. By bookmarking, a user can mark in the browser a web page of interest. The browser can record information such as address and name of the web page, and display the recorded information on a unified interface in an index. Thus, the user can easily and quickly find the page of interest when using the browser next time.

In existing browsers, an account system is usually provided. By logging in to a browser account, the user can synchronize his/her own bookmarks on different network terminals. However, if the user needs to share his/her own bookmarks with other browser users, he/she can only share one bookmark at a time through a third-party software interface in the browser. In addition, after receiving the bookmarks shared by the user, other browser users need to manually add the bookmarks to their browser accounts.

BRIEF SUMMARY OF THE DISCLOSURE

One aspect of the present disclosure includes a method for synchronizing browser bookmarks. An exemplary method can be implemented by a server. The method can include receiving a bookmark collection sent by a first terminal browser. The bookmark collection can contain one or more bookmarks. The method can further include pushing the bookmark collection to a second terminal browser for the second terminal browser to simultaneously add the one or more bookmarks contained in the bookmark collection as bookmarks of the second terminal browser.

Another aspect of the present disclosure includes a system for synchronizing browser bookmarks. The system can include a server. The server can be configured to receive a bookmark collection containing one or more bookmarks sent by a first terminal browser. The server can further be configured to push the bookmark collection to a second terminal browser for the second terminal browser to simultaneously add the one or more bookmarks contained in the bookmark collection as bookmarks of the second terminal browser.

Another aspect of the present disclosure includes an apparatus for synchronizing browser bookmarks. The apparatus can include an electronic device. The electronic device can be configured to send a bookmark collection containing one or more bookmarks to a server, via a first terminal browser installed in the electronic device. The server can then push the bookmark collection to a second terminal browser for the second terminal browser to simultaneously add the one or more bookmarks contained in the bookmark collection as bookmarks of the second terminal browser.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

In various disclosed embodiments, a bookmark collection of a terminal browser can contain multiple bookmarks. The bookmark collection can be synchronized at one time (i.e., simultaneously) to another terminal browser, e.g., by "one-click". Thus, sharing of bookmarks among various terminal browsers can be quickly and easily achieved, and browser bookmarks can be more shareable.

As used herein, unless otherwise specified, "browser bookmarks" and "bookmarks" can be used interchangeably. A bookmark can refer to various suitable identifiers for a web resource (e.g., a web page) including, e.g., uniform resource locator (URL), address, name, etc. A bookmark collection can contain one or more bookmarks and/or one or more bookmark folders, without limitation. For illustrative purposes, in some examples, the bookmark collection can contain multiple bookmarks.

Figure 1:
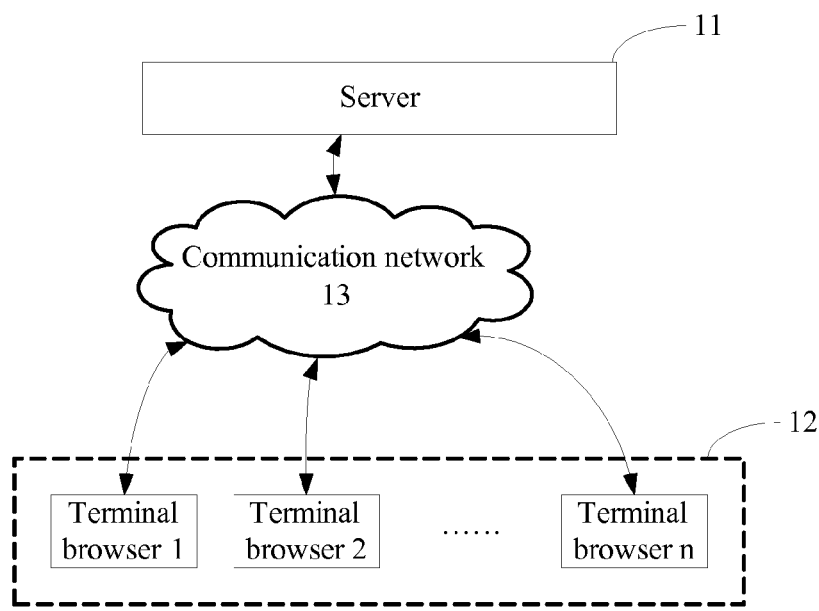
FIG. 1 depicts an exemplary system architecture incorporating methods for synchronizing browser bookmarks in accordance with various disclosed embodiments.

FIG. 1 depicts an exemplary system architecture (or environment) incorporating methods for synchronizing browser bookmarks in accordance with various disclosed embodiments. As shown in FIG. 1, the system architecture can include a server 11 and multiple terminal browsers 12 and, optionally, a communication network 13. The server 11 and the terminal browsers 12 may be coupled through the communication network 13 for information exchange, such as sending/receiving bookmark collections, sending/receiving bookmark sharing or synchronization requests, etc. Although one server 11 and multiple terminal browsers 12 are shown in the system architecture, any number of servers 11 and terminal browsers 12 may be included, and other devices may also be included.

The communication network 13 may include any appropriate type of communication network for providing network connections to the server 11 and terminal browser 12 or among servers 11 or terminal browsers 12. For example, the communication network 13 may include the Internet or other types of computer networks or telecommunication networks, either wired or wireless.

Each terminal browser 12 can be a browser implemented on a terminal device (or a terminal). A terminal, as used herein, may refer to any appropriate user terminal device with certain computing capabilities and/or network access, e.g., a personal computer (PC), a work station computer, a hand-held computing device (e.g., a tablet computer), a mobile terminal (e.g., a mobile phone or a smart phone), or any other client-side computing device. The terminal device can provide an operating environment for the terminal browser 12 and ensure communication between the terminal browser 12 and the server 11. On each terminal device, there can be one or more terminal browsers 12 running simultaneously and independently, without limitation.

The server 11, as used herein, may refer to one or more server computers configured to provide certain server functionalities, e.g., sending bookmark collection, pushing bookmark collection, and receiving various requests from the terminal devices. A server may also include one or more processors to execute computer programs in parallel.

In one embodiment, the server 11 can include a cloud server for backing up and managing relevant information of each terminal browser 12, based on cloud-based synchronization technology. For example, the relevant information can include account information for logging in the terminal browser 12 including account name, password, etc., or globally unique identifier (GUID) of the terminal browser 12. Meanwhile, the server 11 can be used to back up and manage user browsing behavior information, e.g., bookmarks, and/or other suitable information relevant to each terminal browser 12.

In various embodiments, the cloud synchronization technology can refer to data synchronization on a cloud platform between a cloud device (e.g., a terminal having a terminal browser) and a server. In one embodiment, the cloud synchronization technology can further refer to data synchronization between different terminal browsers.

Figure 8:
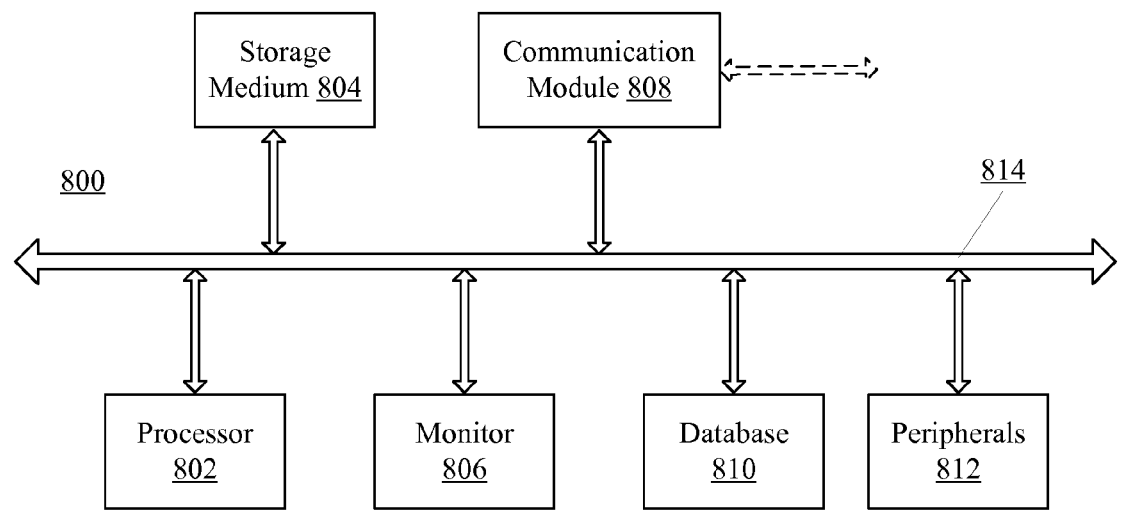
FIG. 8 depicts an exemplary computing system consistent with the disclosed embodiments.

The server 11 and the terminals (installed with the terminal browsers 12) may be implemented on any appropriate computing platform. FIG. 8 shows a block diagram of an exemplary computing system 800 capable of implementing the server 11 and/or the terminals. As shown in FIG. 8, the exemplary computer system 800 may include a processor 802, a storage medium 804, a monitor 806, a communication module 808, a database 810, peripherals 812, and one or more bus 814 to couple the devices together. Certain devices may be omitted and other devices may be included.

The processor 802 can include any appropriate processor or processors. Further, the processor 802 can include multiple cores for multi-thread or parallel processing. The storage medium 804 may include memory modules, e.g., Read-Only Memory (ROM), Random Access Memory (RAM), and flash memory modules, and mass storages, e.g., CD-ROM, U-disk, removable hard disk, etc. The storage medium 804 may store computer programs for implementing various processes (e.g., receiving and processing various requests sent from terminal devices) when executed by the processor 802, and/or backing up data (e.g., user browsing behavior information including bookmarks).

The monitor 806 may include display devices for displaying contents in the computing system 800, e.g., displaying web pages on a browser. The peripherals 812 may include I/O devices such as keyboard and mouse.

Further, the communication module 808 may include network devices for establishing connections through the communication network 13. The database 810 may include one or more databases for storing certain data and for performing certain operations on the stored data, e.g., storing and managing account information and/or GUID of various terminal browsers, storing and managing user browsing behavior information, etc.

In operation, the terminal browsers 12 may cause the server 11 to perform certain actions, e.g., receiving bookmark sharing or synchronization requests from a terminal, or pushing bookmark collections. The server 11 may be configured to provide structures and functions for such actions and operations. The terminals may be configured to provide structures and functions correspondingly for suitable actions and operations.

Figure 2:
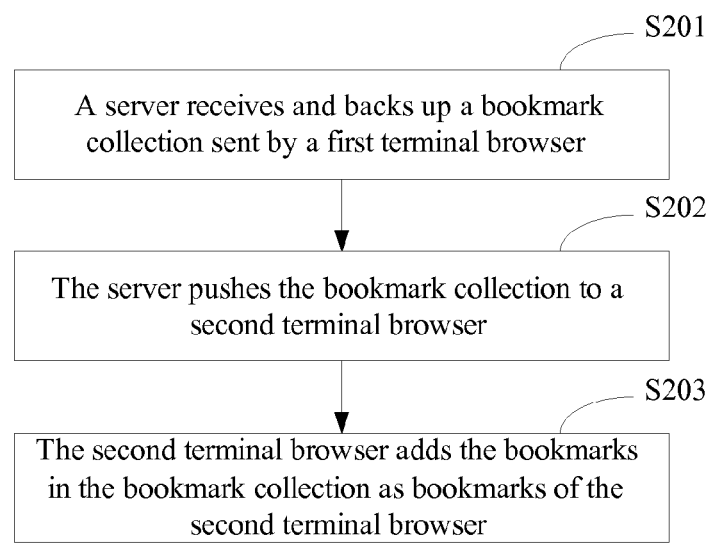
FIG. 2 depicts a flow diagram of an exemplary method for synchronizing browser bookmarks in accordance with various disclosed embodiments.

FIG. 2 depicts a flow diagram of an exemplary method for synchronizing browser bookmarks in accordance with various disclosed embodiments. The method can be further detailed in the following steps.

In Step S201, a server receives and backs up a bookmark collection sent by a first terminal browser. In one embodiment, the first terminal can send the bookmark collection to the server. The bookmark collection can contain multiple bookmarks, which can be all or part of bookmarks of the first terminal browser. In various embodiments, after the server receives the bookmark collection, the bookmark collection can be stored on the server before being subsequently pushed to a second terminal browser. Optionally, the storing of the bookmark collection can include backing up the bookmark collection in any suitable storage medium on the server.

Figure 3:
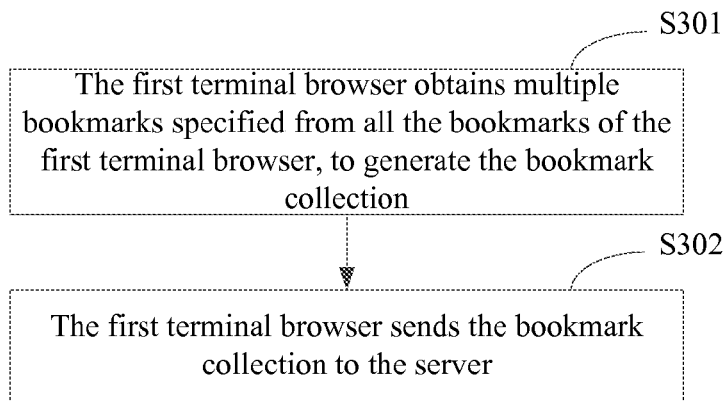
FIG. 3 depicts a flow diagram of another exemplary method for synchronizing browser bookmarks in accordance with various disclosed embodiments.

FIG. 3 depicts a flow diagram of another exemplary method for synchronizing browser bookmarks in accordance with various disclosed embodiments. As shown in the example in FIG. 3, before Step S201, the method can further include the following steps.

In Step S301, the first terminal browser obtains specified multiple bookmarks from all the bookmarks of the first terminal browser, to generate the bookmark collection for sending to the server. The specified multiple bookmarks can include bookmarks for web pages about a particular topic, e.g., bookmarks specifically about music forums. The multiple bookmarks can also include multiple bookmarks randomly specified for sharing. By obtaining the bookmarks specified from all the bookmarks of the first terminal browser, the bookmark collection to be shared with other terminal browser(s) can be generated.

In Step S302, the first terminal browser sends the bookmark collection to the server. In some embodiments, after the server receives the bookmark collection sent by the first terminal browser, when backing up the bookmark collection, the server can link the bookmark with an identifier of a sender (in this case, the first terminal browser). The identifier can include, e.g., the account name used for logging in the first terminal browser, the GUID of the first terminal browser, or any other suitable identifiers. In other embodiments, at the same time when the first terminal browser generates the bookmark collection, by specified naming or by system defaulted naming, a collection identifier corresponding to the bookmark collection can be generated.

While sending the bookmark collection, the collection identifier can be sent together. Thus, when the server backs up the bookmark collection, the collection identifier corresponding to the bookmark collection can be backed up at the same time.

Referring back to FIG. 2, in Step S202, the server pushes the bookmark collection to a second terminal browser. In one embodiment, after receiving an instruction from the first terminal browser, the server can actively push the bookmark collection of the first terminal browser to the second terminal browser. In another embodiment, the server can push the bookmark collection of the first terminal browser to the second terminal browser according to a request from the second terminal browser. Such steps are illustrated further in various examples in the specification.

In Step S203, the second terminal browser adds the bookmarks of the bookmark collection as bookmarks of the second terminal browser. In various embodiments, when the second terminal browser receives the bookmark collection pushed by the server, the second terminal browser can automatically or directly add the multiple bookmarks of the bookmark collection to a bookmark list of the second terminal browser. That is, the bookmarks of the bookmark collection can be synchronized, such that the bookmarks of the bookmark collection can be added as (i.e., included in) bookmarks of the second terminal browser.

In one embodiment, the first terminal browser can be a browser that can be logged in using a first account, while the second terminal browser can be a browser that can be logged in using a second account. Therefore, in various embodiments, sharing of bookmarks between different accounts (or different browser accounts) can be achieved.

In various embodiments, a bookmark collection (containing multiple bookmarks) of a terminal browser can be synchronized simultaneously to another terminal browser. Thus, sharing of bookmarks among various terminal browsers can be quickly and easily achieved, and browser bookmarks can be more shareable.

Figure 4:
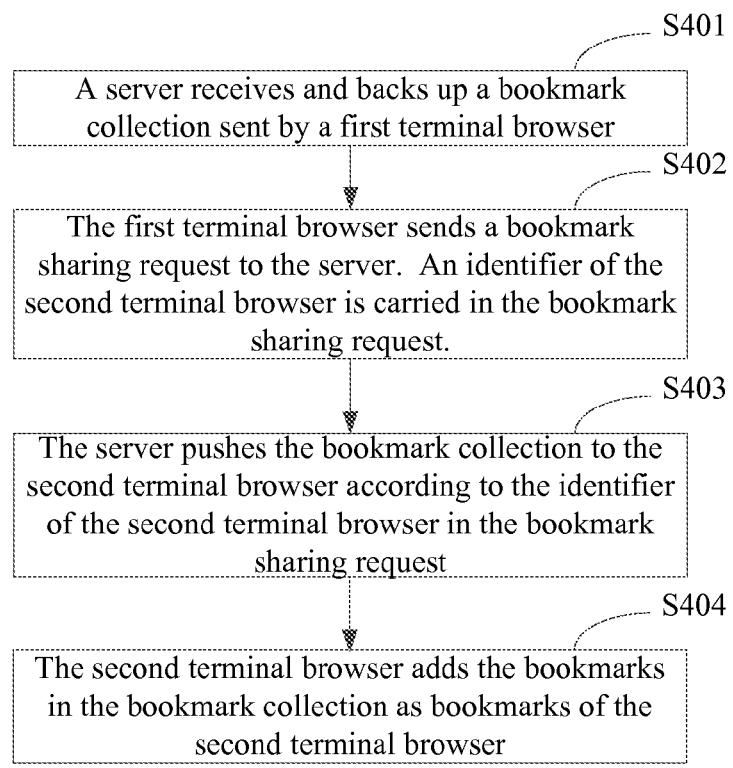
FIG. 4 depicts a flow diagram of another exemplary method for synchronizing browser bookmarks in accordance with various disclosed embodiments.

In one embodiment, after receiving an instruction from the first terminal browser, the server can actively push the bookmark collection of the first terminal browser to the second terminal browser. For example, FIG. 4 depicts a flow diagram of another exemplary method for synchronizing browser bookmarks in accordance with various disclosed embodiments. As shown in FIG. 4, in Step S401, a server receives and backs up a bookmark collection sent by a first terminal browser. Before Step S403 (i.e., before the server pushes the bookmark collection to a second terminal browser), the method can further include the following steps.

In Step S402, the first terminal browser sends a bookmark sharing request to the server. An identifier of the second terminal browser can be carried in the bookmark sharing request.

In one embodiment, the identifier of the second terminal browser can be carried in the bookmark sharing request sent by the first terminal browser, in order to instruct the server to push the bookmark collection (backed up by the server) of the first terminal browser to the second terminal browser according to the identifier of the second terminal browser.

The identifier of the second terminal browser can include, e.g., an account name used for logged in the second terminal browser. In one embodiment, the account name used for logging in the second terminal browser can be obtained from a "friend account list" of an account (e.g., the first account) used for logging in the first terminal browser. For example, a user of the first account can select a friend from his/her friend account list. The friend account list can include a list of account names of his/her friends. The selected friend can be a user of the second account. The account name of the selected friend (i.e., the second account) can thus be used as the identifier of the second terminal browser.

In one embodiment, the pushing of the bookmark collection by the server to the second terminal browser can include the following steps. For example, in Step S403, the server pushes the bookmark collection to the second terminal browser, according to the identifier of the second terminal browser in the bookmark sharing request. In various embodiments, by confirming whether to receive the bookmark collection pushed by the server, the second terminal browser can achieve the synchronizing of bookmarks with the first terminal browser. In Step S404, the second terminal browser adds the bookmarks of the bookmark collection as bookmarks of the second terminal browser.

In another embodiment, the server can push the bookmark collection of the first terminal browser to the second terminal browser according to a request of the second terminal browser. For example, after the server receives and backs up the bookmark collection of the first terminal browser, the first terminal browser can send a bookmark sharing request to the second terminal browser. When the second terminal browser accepts the bookmark sharing request, the second terminal browser can actively request from the server the bookmark collection of the first terminal browser. For example, FIG. 5 depicts a flow diagram of another exemplary method for synchronizing browser bookmarks in accordance with various disclosed embodiments.

Figure 5:
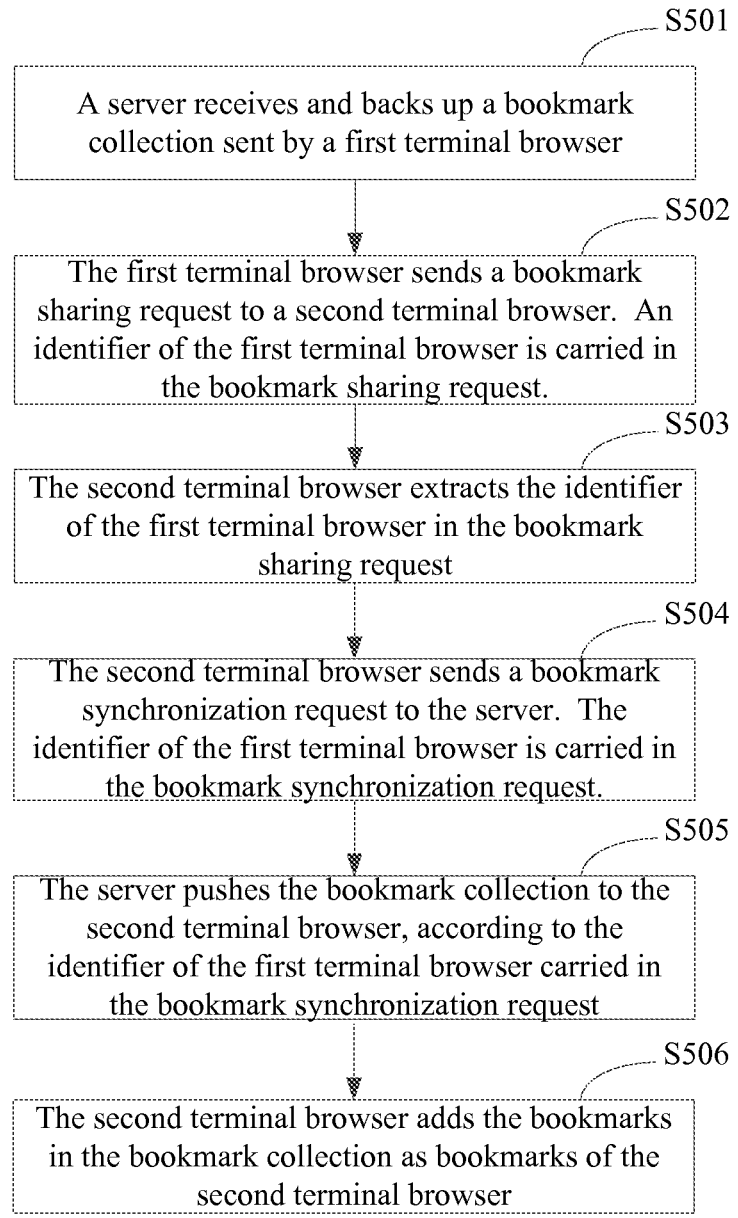
FIG. 5 depicts a flow diagram of another exemplary method for synchronizing browser bookmarks in accordance with various disclosed embodiments.

As shown in FIG. 5, in Step S501, a server receives and backs up a bookmark collection sent by a first terminal browser. In Step S502, the first terminal browser sends a bookmark sharing request to a second terminal browser. An identifier of the first terminal browser can be carried in the bookmark sharing request.

In one embodiment, the first terminal browser can send the bookmark sharing request to all of the other accounts, in order to openly share the bookmark collection. The "other accounts" can refer to the accounts that are in a same account system as the account currently used for logging in to the first terminal browser (e.g., the first account).

In another embodiment, before performing Step S502, the first terminal browser can send the bookmark sharing request to one or more specified accounts among the other accounts. The "other accounts" can refer to the accounts that are in the same account system as the account currently used for logging in to the first terminal browser (e.g., the first account).

In Step S503, the second terminal browser extracts the identifier of the first terminal browser in the bookmark sharing request. In Step S504, the second terminal browser sends a bookmark synchronization request to the server. The identifier of the first terminal browser can be carried in the bookmark synchronization request.

In one embodiment, the bookmark synchronization request can be used to request the server to issue (or retrieve) the bookmark collection backed up on the server. Using the identifier of the first terminal browser carried in the bookmark synchronization request, the server can return the bookmark collection sent (or uploaded) by the first terminal browser, according to the identifier.

Thus, the pushing of the bookmark collection by the server to the second terminal browser can include the following steps. In Step S505, the server pushes the bookmark collection to the second terminal browser, according to the identifier of the first terminal browser carried in the bookmark synchronization request. In Step S506, the second terminal browser adds the bookmarks of the bookmark collection as bookmarks of the second terminal browser.

Thus, the server can directly return (or push) to the second terminal browser the bookmark collection shared by the first terminal browser. So the synchronization of bookmarks can be achieved.

In another embodiment, a collection identifier of the bookmark collection (to be shared by the first terminal browser) can be carried in the bookmark sharing request sent by the first terminal browser to the second terminal browser. For example, FIG. 6 depicts a flow diagram of another exemplary method for synchronizing browser bookmarks in accordance with various disclosed embodiments.

Figure 6:
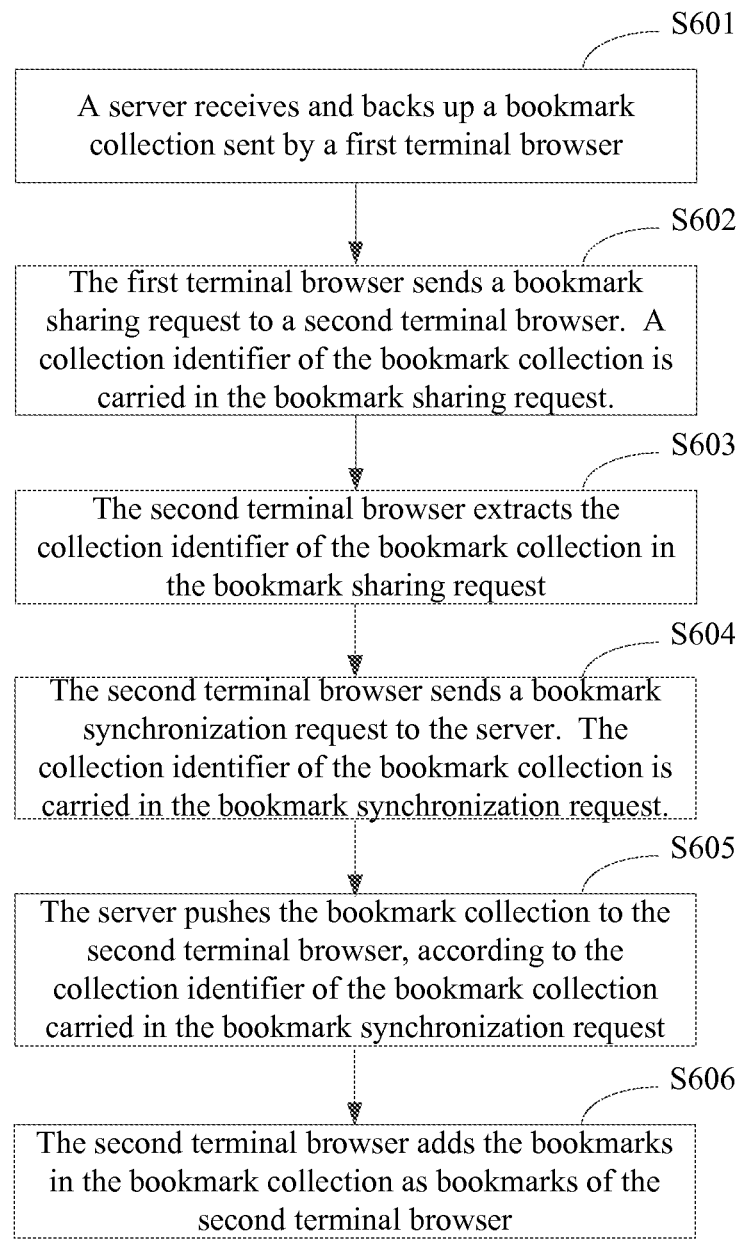
FIG. 6 depicts a flow diagram of another exemplary method for synchronizing browser bookmarks in accordance with various disclosed embodiments.

Referring to FIG. 6, in Step S601, a server receives and backs up a bookmark collection sent by a first terminal browser. In Step S602, the first terminal browser sends the bookmark sharing request to a second terminal browser. A collection identifier of the bookmark collection can be carried in the bookmark sharing request.

In Step S603, the second terminal browser extracts the collection identifier of the bookmark collection that is carried in the bookmark sharing request. In Step S604, the second terminal browser sends the bookmark synchronization request to the server. The collection identifier of the bookmark collection can be carried in the bookmark synchronization request.

The server can push the bookmark collection to the second terminal browser using the following step. For example, in Step S605, the server pushes the bookmark collection to the second terminal browser, according to the collection identifier of the bookmark collection carried in the bookmark synchronization request. In Step S606, the second terminal browser adds the bookmarks of the bookmark collection as bookmarks of the second terminal browser.

In one embodiment, by carrying in the bookmark synchronization request the collection identifier of the bookmark collection for sharing, the server can return the corresponding bookmark collection based on the collection identifier. In various embodiments, among all bookmark collections backed up on the server, the collection identifier can uniquely identify its corresponding bookmark collection.

In comparison with various other disclosed embodiments (e.g., as shown in FIG. 5), the example shown in FIG. 6 can be applicable when the first account needs to share different bookmark collections respectively with different other accounts. That is, one account can have multiple different bookmark collections backed up on the server, and synchronization of the multiple different bookmark collections with other accounts can be achieved.

In various disclosed embodiments, a bookmark collection (containing multiple bookmarks) of a browser account can be synchronized to another browser account simultaneously. Thus, sharing of bookmarks among various terminal browsers can be quickly and easily achieved, and browser bookmarks can be more shareable.

Figure 7:
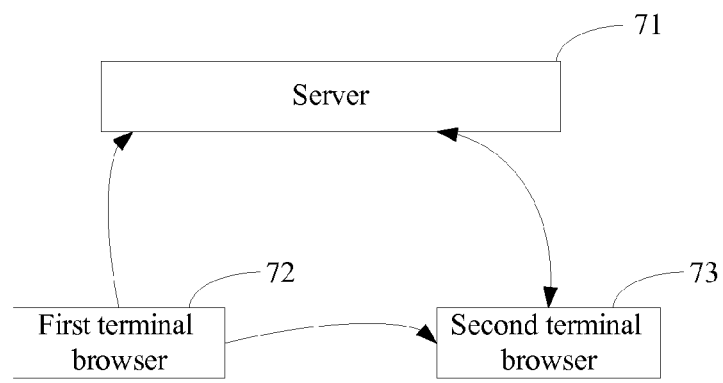
FIG. 7 depicts a structure diagram of an exemplary system for synchronizing browser bookmarks in accordance with various disclosed embodiments.

FIG. 7 depicts a structure diagram of an exemplary system for synchronizing browser bookmarks in accordance with various disclosed embodiments. In various embodiments, the system can be distributed in the system architecture (e.g., as shown in FIG. 1), and can implement the exemplary methods for synchronizing browser bookmarks in accordance with various disclosed embodiments (e.g., as shown in FIGS. 2-6). Referring to FIG. 7, the system can include a server 71, a first terminal browser 72, and a second terminal browser 73. The terminal browsers can be implemented on suitable terminal devices, respectively. For example, the first terminal browser 72 can be implemented by a first terminal device, and the second terminal browser 73 can be implemented by a second terminal device. Thus, the first terminal device and the second terminal device can be included in the system. The first terminal device and the second terminal device can each be an electronic device as depicted in accordance with various embodiments (e.g., as shown in FIG. 8). Further, the first terminal device and the second terminal device can be different electronic devices or reside in a same electronic device, without limitation.

Some devices may be omitted and other devices may be included. For example, a communication network (not shown) may be included to couple the server 71, the first terminal browser 72, and the second terminal browser 73. In various embodiments, the communication network can be similar to or the same as depicted in accordance with various embodiments (e.g., as shown in FIG. 1).

The server 71 is configured to receive and back up a bookmark collection sent by the first terminal browser 72, and to push the bookmark collection to the second terminal browser 73. The second terminal browser 73 is configured to add the bookmarks contained in the bookmark collection as bookmarks of the second terminal browser 73.

Optionally, the first terminal browser 72 is configured to obtain multiple bookmarks specified from all its bookmarks to generate the bookmarks collection, and to send the bookmark collection to the server 71. Optionally, the first terminal browser 72 is a browser that can be logged in using a first account, and the second terminal browser 73 is a browser that can be logged in using a second account.

Optionally, the first terminal browser 72 is configured to send a bookmark sharing request to the server 71. An identifier of the second terminal browser 73 can be carried in the bookmark sharing request. For example, the server 71 can be configured to push the bookmark collection to the second terminal browser 73 according to the identifier of the second terminal browser 73 carried in the bookmark sharing request.

Optionally, the first terminal browser 72 is configured to send a bookmark sharing request to the second terminal browser 73. An identifier of the first terminal browser 72 can be carried in the bookmark sharing request. The second terminal browser 73 can be configured to extract the identifier of the first terminal browser 72 in the bookmark sharing request and to send a bookmark synchronization request to the server 71. The identifier of the first terminal browser 72 can be carried in the bookmark synchronization request. For example, the server 71 can be configured to push the bookmark collection to the second terminal browser 73, according to the identifier of the first terminal browser 72 carried in the bookmark synchronization request.

Optionally, the first terminal browser 72 is configured to send a bookmark sharing request to the second terminal browser 73. A collection identifier of the bookmark collection can be carried in the bookmark sharing request. The second terminal browser 73 can be configured to extract the collection identifier of the bookmark collection that is carried in the bookmark sharing request, and to send a bookmark synchronization request to the server 71. The collection identifier of the bookmark collection can be carried in the bookmark synchronization request. For example, the server 71 can be configured to push the bookmark collection to the second terminal browser 73 according to the collection identifier of the bookmark collection carried in the bookmark synchronization request.

In various disclosed embodiments, a bookmark collection (containing multiple bookmarks) of a browser account can be synchronized to another browser account simultaneously. Thus, sharing of bookmarks among various terminal browsers can be quickly and easily achieved, and browser bookmarks can become more shareable.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and systems can be used in a variety of Internet applications. By using the disclosed methods and systems, a server can receive a bookmark collection sent by a first terminal browser. The bookmark collection can contain one or more bookmarks. The server can then push the bookmark collection to a second terminal browser for the second terminal browser to simultaneously add the one or more bookmarks contained in the bookmark collection as bookmarks of the second terminal browser.

In the disclosed methods, the bookmark collection (containing multiple bookmarks) can be synchronized at one time (i.e., simultaneously) to another terminal browser or another browser account, e.g., by "one-click". Thus, sharing of bookmarks among various terminal browsers or various browser accounts can be quickly and easily achieved, and browser bookmarks can be more shareable.

What is claimed is:

1. A method for synchronizing browser bookmarks, comprising:
    receiving, by a server, a bookmark collection sent by a first terminal browser, wherein the bookmark collection contains one or more bookmarks; and
    pushing, by the server, the bookmark collection to a second terminal browser for the second terminal browser to simultaneously add the one or more bookmarks contained in the bookmark collection as bookmarks of the second terminal browser,
    wherein, before the pushing of the bookmark collection to the second terminal browser, the method further includes:
        sending, by the first terminal browser, a bookmark sharing request to the second terminal browser, the bookmark sharing request containing an identifier of the first terminal browser, wherein the identifier is a globally unique identifier (GUID) of the first terminal browser managed by the server;
        extracting, by the second terminal browser, the identifier of the first terminal browser from the bookmark sharing request; and
        sending, by the second terminal browser, a bookmark synchronization request to the server, the bookmark synchronization request containing the identifier of the first terminal browser; and
    wherein the pushing of the bookmark collection to the second terminal browser includes:
        pushing, by the server, the bookmark collection to the second terminal browser according to the identifier of the first terminal browser contained in the bookmark synchronization request.

2. The method according to claim 1, wherein, before the receiving of the bookmark collection, the method further includes:
    obtaining, by the first terminal browser, the one or more bookmarks specified from all bookmarks of the first terminal browser, to generate the bookmark collection; and
    sending, by the first terminal browser, the bookmark collection to the server.

3. The method according to claim 1, wherein:
    the first terminal browser is a browser logged in using a first account; and
    the second terminal browser is a browser logged in using a second account.

4. The method according to claim 3, wherein, before the pushing of the bookmark collection to the second terminal browser, the method further includes:
    sending, by the first terminal browser, a bookmark sharing request to the server, the bookmark sharing request containing an identifier of the second terminal browser; and
    wherein the pushing of the bookmark collection to the second terminal browser includes:
    pushing, by the server, the bookmark collection to the second terminal browser according to the identifier of the second terminal browser contained in the bookmark sharing request.

5. The method according to claim 1, wherein, before the pushing of the bookmark collection to the second terminal browser, the method further includes:
    sending, by the first terminal browser, a bookmark sharing request to the second terminal browser, the bookmark sharing request containing a collection identifier of the bookmark collection;
    extracting, by the second terminal browser, the collection identifier of the bookmark collection from the bookmark sharing request; and
    sending, by the second terminal browser, a bookmark synchronization request to the server, the bookmark synchronization request containing the collection identifier of the bookmark collection; and
    wherein the pushing of the bookmark collection to the second terminal browser includes:
    pushing, by the server, the bookmark collection to the second terminal browser according to the collection identifier of the bookmark collection contained in the bookmark synchronization request.

6. A system for synchronizing browser bookmarks, comprising:
    a server,
    a first terminal comprising a first processor and a first storage medium, the first processor being configured to execute a first terminal browser stored in the first storage medium, and
    a second terminal comprising a second processor and a second storage medium, the second processor being configured to execute a second terminal browser stored in the second storage medium; wherein:
    the server is configured to receive a bookmark collection containing one or more bookmarks sent by a first terminal browser, and to push the bookmark collection to a second terminal browser for the second terminal browser to simultaneously add the one or more bookmarks contained in the bookmark collection as bookmarks of the second terminal browser;

the first terminal browser is configured to send a bookmark sharing request to the second terminal browser, the bookmark sharing request containing an identifier of the first terminal browser, wherein the identifier is a globally unique identifier (GUID) of the first terminal browser managed by the server;

the second terminal browser is configured to: extract the identifier of the first terminal browser from the bookmark sharing request; and send a bookmark synchronization request to the server, the bookmark synchronization request containing the identifier of the first terminal browser; and the server is further configured to push the bookmark collection to the second terminal browser according to the identifier of the first terminal browser contained in the bookmark synchronization request.

7. The system according to claim 6, wherein the first terminal browser is configured to:

obtain the one or more bookmarks specified from all bookmarks of the first terminal browser, to generate the bookmark collection; and send the bookmark collection to the server.

8. The system according to claim 6, wherein:

the first terminal browser is a browser logged in using a first account; and the second terminal browser is a browser logged in using a second account.

9. The system according to claim 8, wherein:

the first terminal browser is configured to send a bookmark sharing request to the server, the bookmark sharing request containing an identifier of the second terminal browser; and the server is further configured to push the bookmark collection to the second terminal browser according to the identifier of the second terminal browser in the bookmark sharing request.

10. The system according to claim 6, wherein:

the first terminal browser is configured to send a bookmark sharing request to the second terminal browser, the bookmark sharing request containing a collection identifier of the bookmark collection;

the second terminal browser is configured to:

extract the collection identifier of the bookmark collection from the bookmark sharing request; and send a bookmark synchronization request to the server, the bookmark synchronization request containing the collection identifier of the bookmark collection; and the server is further configured to push the bookmark collection to the second terminal browser according to the collection identifier of the bookmark collection contained in the bookmark synchronization request.

11. An apparatus for synchronizing browser bookmarks, comprising:

a memory, and one or more processor configured to send a bookmark collection containing one or more bookmarks to a server, via a first terminal browser installed in the apparatus, for the server to push the bookmark collection to a second terminal browser for the second terminal browser to simultaneously add the one or more bookmarks contained in the bookmark collection as bookmarks of the second terminal browser;

wherein:

the one or more processor is further configured to send, via the first terminal browser, a bookmark sharing request to the second terminal browser, the bookmark sharing request containing an identifier of the first terminal browser, wherein the identifier is a globally unique identifier (GUID) of the first terminal browser managed by the server;

the second terminal browser is configured to: extract the identifier of the first terminal browser from the bookmark sharing request; and send a bookmark synchronization request to the server, the bookmark synchronization request containing the identifier of the first terminal browser; and the server is configured to push the bookmark collection to the second terminal browser according to the identifier of the first terminal browser contained in the bookmark synchronization request.

12. The apparatus according to claim 11, wherein the one or more processor is further configured to:

obtain the one or more bookmarks specified from all bookmarks of the first terminal browser, to generate the bookmark collection; and send the bookmark collection to the server.

13. The apparatus according to claim 11, wherein:

the first terminal browser is a browser logged in using a first account; and the second terminal browser is a browser logged in using a second account.

14. The apparatus according to claim 13, wherein:

the one or more processor is further configured to send, via the first terminal browser, a bookmark sharing request to the server, the bookmark sharing request containing an identifier of the second terminal browser; and the server is configured to push the bookmark collection to the second terminal browser according to the identifier of the second terminal browser contained in the bookmark sharing request.

15. The apparatus according to claim 11, wherein:

the one or more processor is further configured to send, via the first terminal browser, a bookmark sharing request to the second terminal browser, the bookmark sharing request containing a collection identifier of the bookmark collection;

the second terminal browser is configured to:

extract the collection identifier of the bookmark collection from the bookmark sharing request; and send a bookmark synchronization request to the server, the bookmark synchronization request containing the collection identifier of the bookmark collection; and the server is configured to push the bookmark collection to the second terminal browser according to the collection identifier of the bookmark collection contained in the bookmark synchronization request.

* * * * *